US006942200B2

(12) United States Patent
Gu

(10) Patent No.: US 6,942,200 B2
(45) Date of Patent: Sep. 13, 2005

(54) FAN CYLINDER FOR COOLING TOWER

(75) Inventor: Jae Byeong Gu, Incheon (KR)

(73) Assignee: Kyung in Machinery Co., Ltd., Incheon (KR)

(*) Notice: Subject to any disclaimer, the term of this patent is extended or adjusted under 35 U.S.C. 154(b) by 0 days.

(21) Appl. No.: 10/786,253

(22) Filed: Feb. 24, 2004

(65) Prior Publication Data

US 2005/0127539 A1 Jun. 16, 2005

(30) Foreign Application Priority Data

Dec. 10, 2003 (KR) ..................... 10-2003-0089661

(51) Int. Cl.[7] ................................................ B01F 3/04

(52) U.S. Cl. ............................. 261/109; 261/DIG. 11; 165/122; 165/178; 165/900; 454/42; 454/341

(58) Field of Search .......................... 261/96, 102, 105, 261/109, DIG. 11; 165/59, 60, 99, 121, 122, 165/178, 900; 454/42, 253, 341

(56) References Cited

U.S. PATENT DOCUMENTS

| | | | | | |
|---|---|---|---|---|---|
| 2,890,864 | A | * | 6/1959 | Stutz | 62/310 |
| 3,759,496 | A | * | 9/1973 | Teller | 261/94 |
| 3,767,176 | A | * | 10/1973 | Engalitcheff et al. | 261/111 |
| 4,374,072 | A | * | 2/1983 | Bell, Jr. | 261/109 |
| 4,549,999 | A | * | 10/1985 | Ernst et al. | 261/109 |

* cited by examiner

*Primary Examiner*—Scott Bushey
(74) *Attorney, Agent, or Firm*—Squire, Sanders & Dempsey L.L.P.

(57) ABSTRACT

Disclosed herein is a fan cylinder for a cooling tower, which is configured to prevent the air discharged from the cooling tower from flowing back thereinto. The fan cylinder is fixed to the upper side of the cooling tower, and is configured to mount a cooling fan therein. The fan cylinder comprises a linear portion having a constant inner diameter, and mounted therein with the cooling fan; an inlet portion connected at an upper end thereof to a lower end of the linear portion, and having an inner diameter increasing downwardly; an extension portion connected at a lower end thereof to an upper end of the linear portion; and having an inner diameter increasing upwardly, and an outlet portion connected to an upper end of the extension portion, and having an inner diameter decreasing upwardly.

1 Claim, 4 Drawing Sheets

PRIOR ART

PRIOR ART

FAN CYLINDER FOR COOLING TOWER

PRIORITY REFERENCE TO PRIOR APPLICATION

This application claims benefit under 35 U.S.C. §119 of Korean patent application number 10-2003-0089661, entitled "FAN CYLINDER FOR COOLING TOWER," filed on Dec. 10, 2003, by inventor Jae Byeong GU.

BACKGROUND OF THE INVENTION

1. Field of the Invention

The present invention relates generally to a fan cylinder to be installed to the upper side of a cooling tower, and more particularly to a fan cylinder for a cooling tower, which is configured so as to prevent the air discharged from the cooling tower from flowing back into the cooling tower, as well as, to achieve a reduction in transmission of noise generated during operation of a cooling fan.

2. Description of the Related Art

As is well known, cooling towers are installed in a freezer, heat exchangers, or air conditioning equipments in order to absorb heat from high temperature cooling water used in heat exchange, and to continuously supply with low temperature cooling water.

Typically, a cooling tower is constructed so that it forcibly introduces substantially dry low temperature outside air thereinto using a cooling fan, and heat-exchanges between the inflow air and cooling water, and then discharges resulting hot and humid air outwardly. The cooling fan of the cooling tower is provided at the outer side thereof with a fan cylinder for effective maintenance of air streams discharged outwardly from the cooling fan.

Considering one exemplary structure of the cooling tower, as shown in FIG. 1, the cooling fan, designated as reference numeral 21, is installed inside the fan cylinder, designated as reference numeral 20, having an air-discharge opening formed therein. With such a configuration, substantially dry low temperature outside air is introduced into an air-inflow part formed in a side of the cooling tower, and heat-exchanged with cooling water, and then discharged to the outside through the above mentioned air-discharge opening.

The fan cylinder 20 having the air-discharge opening has been formed into various shapes, and is classified, according to the shape thereof, into a fan cylinder consisting of only a linear portion mounted therein with a cooling fan, a fan cylinder further having an inlet portion in addition to the linear portion, and a fan cylinder further having an extension portion in addition to the linear portion and the inlet portion.

These various shapes of the fan cylinder 20 are shown in FIGS. 2A to 2C, respectively. The fan cylinder 20 consisting of only the linear portion, as shown in FIG. 2A, has a height slightly higher than that of the cooling fan 21 mounted therein. Another fan cylinder, as shown in FIG. 2B, is additionally formed at the lower side of the linear portion thereof with an inlet portion, which has an inner diameter increasing downwardly, thereby serving to reduce inlet resistivity of the air introducing into the cooling fan 21. Yet another fan cylinder, as shown in FIG. 2C, is additionally formed at the upper side of the linear portion thereof with an extension portion, which has an inner diameter increasing upwardly, thereby serving to reduce discharge resistivity of the air to be discharged from the cooling fan 21.

Specially, in case of a cross-flow type cooling tower, there is an essential disadvantage in that, since the air-inflow part located in the side of the cooling tower is positioned so close to the air-discharge opening formed at the upper side of the cooling tower, the hot and humid air discharged through the air-discharge opening after completing the heat exchange within the cooling tower, often flows back into the air-inflow part. Because such an inflow of the hot and humid air into the cooling tower is an important reason of a deterioration in capability of the cooling tower, it is insufficient in heat exchange between the inflow air passed through a filler material of the cooling tower and the high temperature cooling water sprayed from the upper side of the cooling tower, and thus cause deteriorative performance of a cooling tower.

Additionally, the fan cylinder of the prior art has in a problem that noise generated from the cooling fan was directly transmitted to the peripheral environment, and cause noise pollution.

SUMMARY OF THE INVENTION

Therefore, the present invention has been made in view of the above problems, and it is an object of the present invention to provide a fan cylinder for a cooling tower, which is configured to guide the air discharged therefrom to flow in a substantially straight upward direction, thereby preventing the air from flowing back into the cooling tower.

It is another object of the present invention to provide a fan cylinder for a cooling tower, which can attenuate most of noise therein.

In accordance with the present invention, the above and other objects can be accomplished by the provision of a fan cylinder for a cooling tower, the fan cylinder being fixed in an upper side of the cooling tower and holding a cooling fan therein, comprising: a linear portion having a constant inner diameter, and mounted therein with the cooling fan; an inlet portion connected at an upper end thereof to a lower end of the linear portion, and having an inner diameter increasing downwardly; an extension portion connected at a lower end thereof to an upper end of the linear portion, and having an inner diameter increasing upwardly; and an outlet portion connected to an upper end of the extension portion, and having an inner diameter decreasing upwardly.

These and other objects, features and advantages of the present invention will be readily apparent to person of ordinary skill in the art upon reading the entirety of this disclosure, which the accompanying drawings and claims.

The use of the same reference label in different drawings indicates the same or like components.

DETAILED DESCRIPTION OF THE PREFERRED EMBODIMENTS

Figure 1:
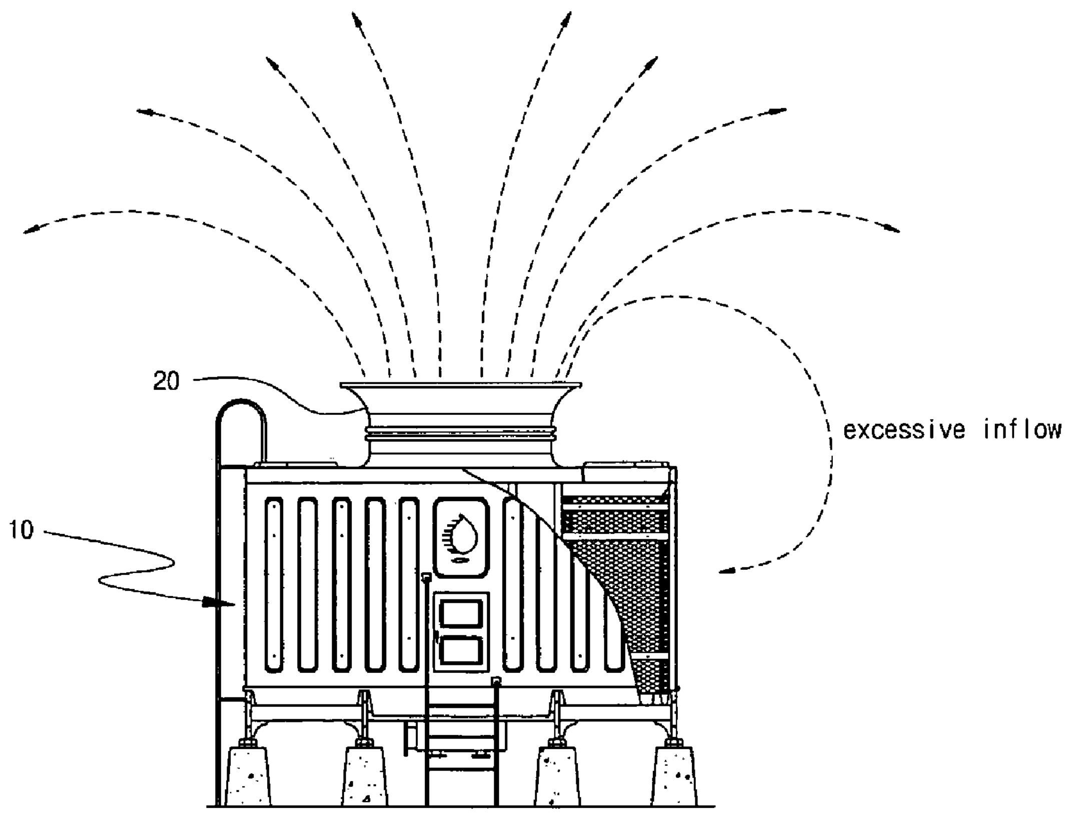
FIG. 1 is a front view illustrating air streams discharged from a conventional cooling tower.
Figure 2A:
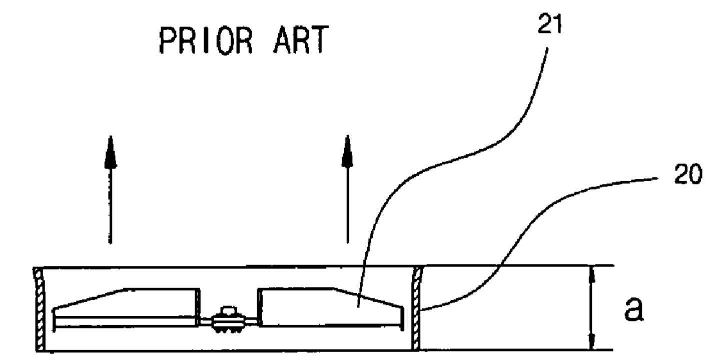
FIGS. 2A to 2C are side views, respectively, illustrating different fan cylinders for conventional cooling towers, FIG. 2A illustrating a fan cylinder consisting of only a linear portion, FIG. 2B illustrating a fan cylinder further having an inlet portion in addition to the linear portion, and FIG. 2C illustrating a fan cylinder further having an extension portion in addition to the linear portion and the inlet portion.
Figure 2B:
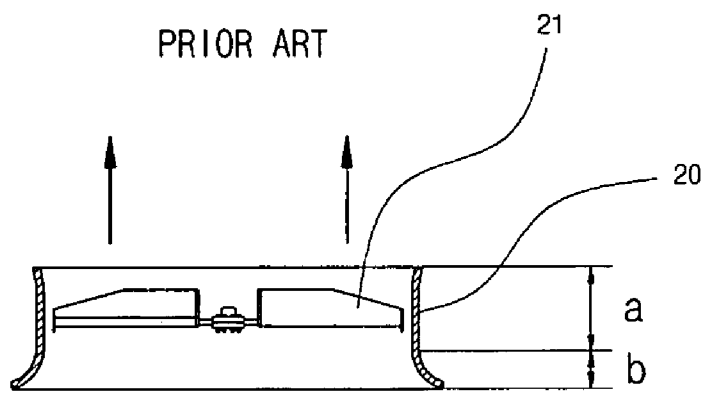
Figure 2C:
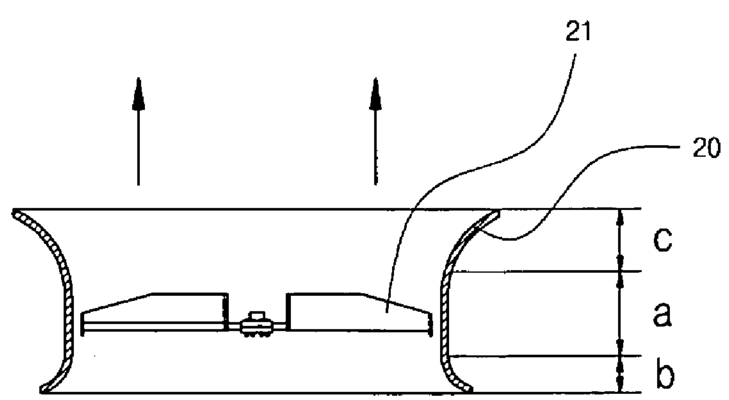
Figure 3:
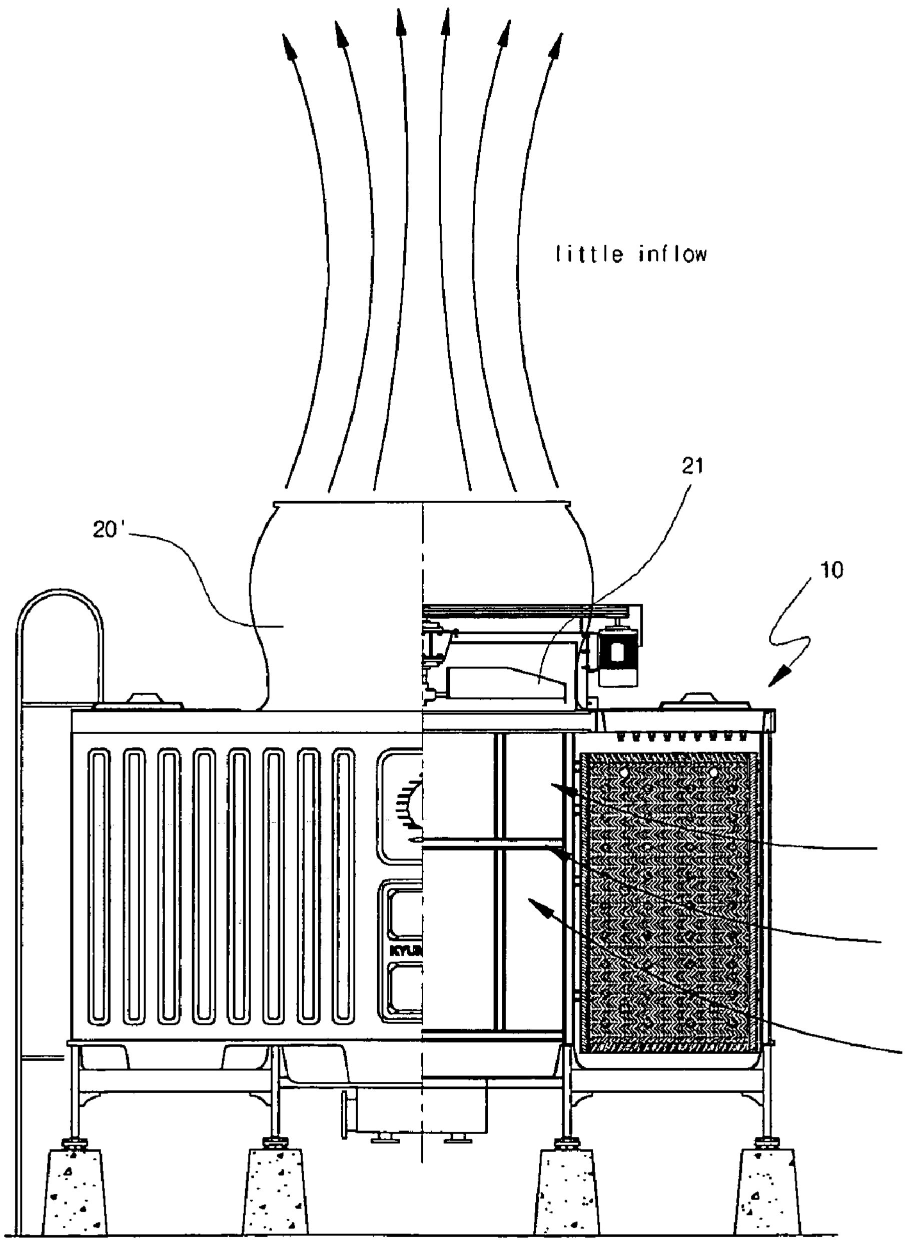
FIG. 3 is a front view illustrating air streams discharged from a cooling tower in accordance with an embodiment of the present invention.
Figure 4:
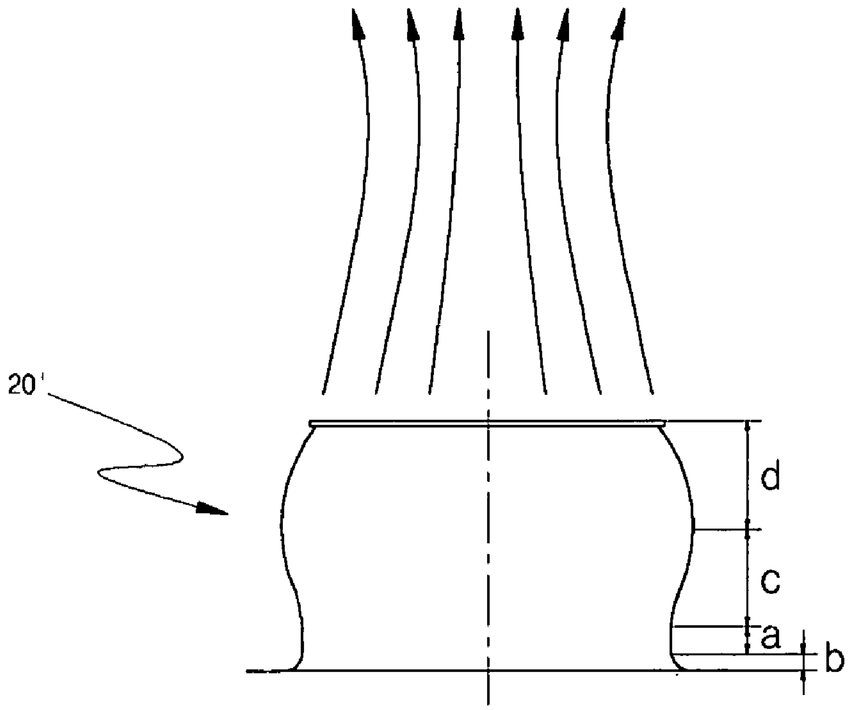
FIG. 4 is a side view illustrating a fan cylinder for a cooling tower in accordance with an embodiment of the present invention.
Figure 5:
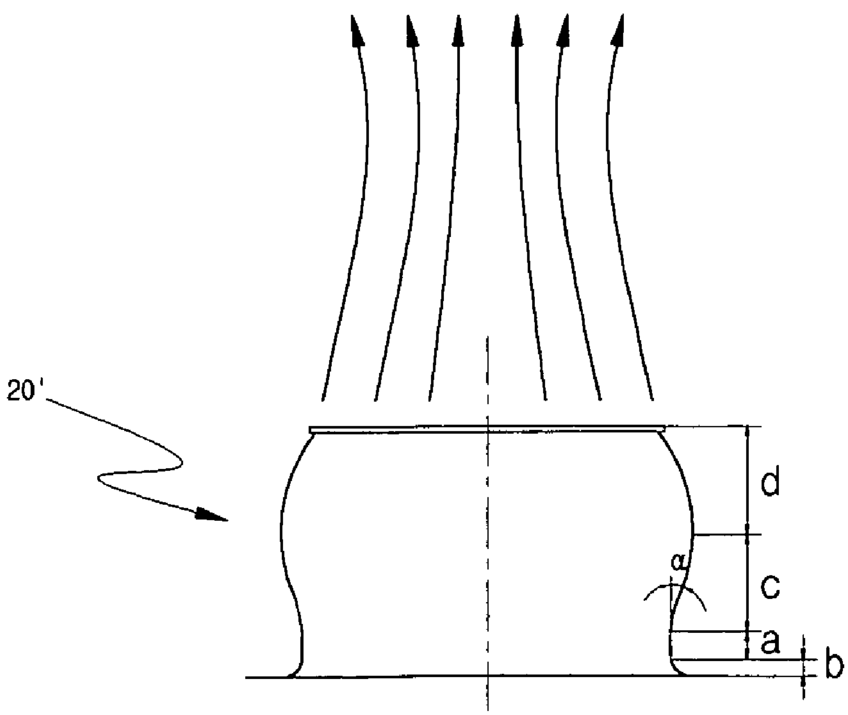
FIG. 5 is a side view illustrating another embodiment of a fan cylinder for a cooling tower in accordance with an embodiment of the present invention.

Referring to FIGS. 3 to 5, there are shown a fan cylinder for a cooling tower in accordance with an embodiment of the present invention.

The fan cylinder 20', for a cooling tower in accordance with the present invention is installed at the upper side of the cooling tower, and comprises a linear portion (a), an inlet portion (b), an extension portion (c), and an outlet portion (d). As can be seen when viewed from one side thereof, the fan cylinder 20' of the present invention has a shape similar to a pot swollen at the middle thereof.

The linear portion (a) of the fan cylinder 20' has a constant inner diameter, and is mounted therein with a cooling fan 21. In this case, the cooling fan 21 is an axial flow fan, and is mounted so that an axis thereof is aligned along an axial direction of the linear portion (a) for guiding air to flow from the lower side of the linear portion (a) adjacent to the cooling tower toward the upper side of the linear portion (a) exposed to the outside.

The linear portion (a) is adapted to produce a negative pressure at the inlet portion of the cooling fan 21, and such a negative pressure facilitates smooth flow of air streams discharged by the fan cylinder 20'.

In this case, in order to decrease loss of electric power, it prefers that an aperture between the inner diameter of the linear portion (a) and an outer diameter of the cooling fan 21 is minimized.

The inlet portion (b) is formed at the lower end of the linear portion (a), and has the same inner diameter at the upper end thereof as that of the linear portion (a), but the inner diameter increases downwardly.

By forming the inlet portion (b) having the downwardly increasing inner diameter at the lower end of the linear portion (a), inlet resistivity of the air introducing into the cooling fan 21 can be reduced. That is, if the fan cylinder consists of only the linear portion (a), it results in excessive inlet resistivity of the air introduced into the cooling fan 21. However, as a result of forming the inlet portion (b) the inner diameter thereof decreased according to flow direction of the air such as a conical or bell shape, that is, inner diameter thereof increases downwardly, and inner diameter thereof decreases upwardly in addition to the inlet portion (b), inlet resistivity of the air introduced into the cooling fan 21 can be reduced.

The extension portion (c) is connected at the lower end thereof to the upper end of the linear portion (a), and has an inner diameter increasing upwardly. By virtue of the extension portion (c) formed at the upper side of the linear portion (a), discharge resistivity of the air discharged through the cooling fan 21 can be reduced.

It is desirable that the inner diameter of the extension portion (c) increases so as to have an inclination angle ($\alpha$) of 5° to 15° relative to an axial direction as shown in FIG. 5. Especially, when the inclination angle ($\alpha$) of the extension portion (c) is 7.5°, the discharge resistivity of the air can be reduced down to approximately 80%.

One reason may be that inclination angle ($\alpha$) of the extension portion (c) such as the above range is limited on a static pressure recovery theory. That is, a discharge velocity of the air is reduced in correspondence to the area variation of the fan cylinder 20', resulting in a conversion of dynamic pressure resistivity into static pressure resistivity. Conventionally, the overall resistivity of the cooling tower can be divided into the static pressure resistivity caused by a collision of the air flowing along the interior of the cooling tower against the inner wall surface of the cooling tower, and the dynamic pressure resistivity caused as the air discharged to the outside through the cooling fan 21. Although the static pressure resistivity caused by the inner wall surface of the fan cylinder 20' still exists even if the fan cylinder 20' is endowed with a predetermined inclination, the discharge velocity of the air is reduced as it passes through the fan cylinder 20' shaped as stated above, resulting in a reduction in discharge resistivity and consequent overall resistivity thereof. If the inclination angle ($\alpha$) of the extension portion (c) is small, efficiency of static pressure recovery is improved, while a height of the fan cylinder 20' adversely increases, resulting in an increase in the amount of required power. As a result, the overall efficiency of the fan cylinder 20' is reduced. If the inclination angle ($\alpha$) of the extension portion (c) exceeds ranges between approx. 15° to approx. 170, air streams to be discharged from the fan cylinder 20' do not flow along the inner wall surface of the fan cylinder 20', thereby making it impossible for the fan cylinder 20' to achieve desired effects.

Therefore, the extension portion (c) must be formed so that the inner diameter defined by its inner wall surface has within the above proposed inclination angle range. Further, when the inclination angle ($\alpha$) of the extension portion (c) is approx. 7.5°, and the inner wall surface of the extension portion (c) is designed in a curved shape, the discharge resistivity of the air can be reduced down to approximately a maximum of 80% as compared to conventional structures.

The outlet portion (d) formed at the upper end of the extension portion (c) has the same inner diameter at the lower end thereof as that of the upper end of the extension portion (c), but the inner diameter decreases upwardly. As a result of the fact that the outlet portion (d) formed at the upper end of the extension portion (c) has an upwardly decreasing inner diameter, air streams discharged from the outer rim region of the fan cylinder 20' are guided so as to flow toward the center thereof.

It is desirable that the inner diameter of the outlet portion (d) is smaller at the upper end thereof than that of the lower end thereof by more than 0.5%.

Now, the operation of the fan cylinder for a cooling tower in accordance with the present invention will be explained.

When the cooling fan 21 mounted inside the fan cylinder 20', which is mounted to the upper end of the cooling tower, is in operation, substantially dry low temperature outside air is introduced into the side of the cooling tower 10, and, after being used for the heat exchange with cooling water sprayed from upper nozzles, is discharged to the outside through the fan cylinder 20'.

The air introduced into the fan cylinder 20' through the lower inlet portion (b) thereof successively passes through the linear portion (a) and the extension portion (c), and is discharged to the outside through the outlet portion (d) of the fan cylinder 20'. In this case, since the upper end of the outlet portion (d) has the inner diameter smaller than that of the upper end of the extension portion (c), air streams discharged from the outer rim region of the fan cylinder 20' flow in a tilted state toward the center of the fan cylinder 20'.

Considering the air streams discharged through the outlet portion (d) of the fan cylinder 20', as shown in FIGS. 3 and 4, just in front of the outlet portion (d), a part of the air streams discharged from the central region of the fan cylinder 20' ascend in a substantially straight axial direction, and the remaining air streams discharged from the outer rim region of the fan cylinder 20' ascend in a slightly tilted state toward a center axis of the fan cylinder 20'. Farther apart from the outlet portion (d) of the fan cylinder 20', the central air streams still continuously ascend in the substantially straight axial direction, but the outer air streams are dispersed in a direction far away from the center axis of the fan cylinder 20'.

As can be seen from the above description, the air streams discharged from the fan cylinder 20' in accordance with the present invention are dispersed in a substantially straight direction while defining a dispersion radius larger than that defined by air streams discharged from the conventional fan cylinder 20. Therefore, differently from the conventional fan cylinder causing re-circulation of the discharged air thereinto, the fan cylinder 20' of the present invention can prevent the discharged air from flowing back into the cooling tower.

Further, the fan cylinder 20' of the present invention is adapted to prevent noise generated by the cooling fan 21 and a cooling fan driving unit within the fan cylinder 20', from being directly transmitted to the peripheral environment of the fan cylinder 20'. That is, since the outlet portion (d) of the fan cylinder 20' is constructed so that the inner diameter thereof decreases upwardly, the noise generated by the cooling fan 21 and the cooling fan driving unit is reflected by the outlet portion (d), is attenuated inside the outlet portion (d), resulting in prevention of emanation of the noise.

As apparent from the above description, a fan cylinder for a cooling tower in accordance with an embodiment of the present invention exhibits various effects.

One effect may be that the fan cylinder can prevent hot and humid air discharged from the cooling tower from flowing back into the cooling tower, resulting in an improvement in cooling efficiency of the cooling tower.

Another effect may be that the fan cylinder of the present invention can eliminate a requirement of such a height, resulting in a reduction in manufacturing and management costs thereof, in comparison with a conventional fan cylinder configured to be a relatively tall in order to prevent the inflow of the air discharged therefrom.

Another effect may be that the fan cylinder of the present invention can achieve a noise pollution reduction effect by preventing noise generated therein from being directly transmitted to the peripheral environment of the cooling tower.

An improved fan cylinder for a cooling tower has been disclosed with specific embodiment, and it is to be understood that the embodiment is for illustration purpose and not limiting. Many additional modifications, additions and substitutions will be apparent to persons of ordinary skill in the art reading this disclosure. Thus, the present invention is limited only by the following claims.

What is claimed is:

1. A fan cylinder for a cooling tower, the fan cylinder being fixed to an upper side of the cooling tower and mounting a cooling fan therein, comprising:

a linear portion having a constant inner diameter, and mounted therein with the cooling fan;

an inlet portion connected at an upper end thereof to a lower end of the linear portion, and having an inner diameter increasing downwardly;

an extension portion connected at a lower end thereof to an upper end of the linear portion, and having an inner diameter increasing upwardly; and an outlet portion connected to an upper end of the extension portion, and having an inner diameter decreasing upwardly.

* * * * *